United States Patent Office 3,112,613
Patented Dec. 3, 1963

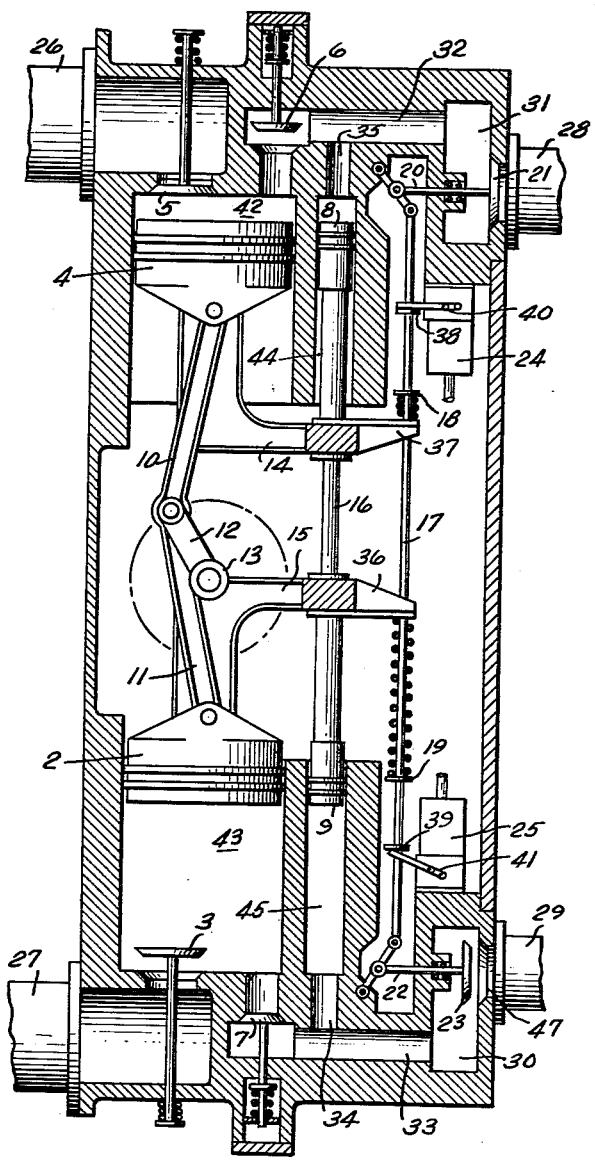

3,112,613
POSITIVE POWER JET ENGINE
Daniel E. Nelson, Millbrae, Calif.
(2316 Pinturo Way, Rancho Cordova, Calif.)
Filed Mar. 22, 1960, Ser. No. 16,718
1 Claim. (Cl. 60—35.6)

This invention relates to a new and useful jet engine which may be used to propel a turbine or to propel objects in the air or in water or in close proximity to surfaces.

In particular, this invention relates to a jet engine in which a set of opposed pistons are used to create a concentration of oxidizing material into which combustible material can be supplied either prior to compression of the oxidizing material and mixed for compression with it and therefore require an ignition system or the combustible material can be supplied to the compressed oxidizing material after it has been compressed in separable combustion chambers which are provided for each compression cylinder. A second set of cylinders is attached to the compression cylinders for purposes of operating the compression cylinders with a portion of the force from the products of combustion before the products of combustion are allowed to escape and to be harnessed for propelling force. Oxidizing material can consist of atmospheric air or of gaseous or powdered material with sufficiently high oxidizing potential to satisfy the requirements of the combustible material under the conditions created by the engine. Combustible material can consist of gaseous, liquid or solid products.

This invention provides higher efficiency in jet engines. The fan-compressor jet and the ramjet are inherently low in thermal efficiency. Jet engines using piston-type compressors heretofore have not used the advantages of their more efficient compression systems to the extent that this device has.

This invention provides an efficient high-mass and comparatively low-velocity locked-power thrust system for friction thrust against water for water-craft propulsion, against solid objects for verticle-take-off craft, against air at speeds less than practical for reactionary jets and against turbine blades or other prime-mover take-offs.

The characteristics of this device in such applications are a definite advantage over high velocity and low efficiency of fan-compressor or pulsating jets. The comparatively low velocity and positive power of this device make possible comparatively high speeds in water transportation by having its products of combustion directed against the water. Vertical take-off and hovering require more positive power to prevent engine failure when used in close association with physical objects. At low speeds, the conventional jet is uneconomical. This device increases efficiency to where travel in a greater range of speeds from low to high is practical.

This invention is illustrated in the accompanying cross-section drawing.

This improved and positive power jet engine comprises a compression piston 2, an intake valve 3, a second compression piston 4, a second intake valve 5, a compression valve 6, a second compression valve 7, an actuating piston 8, a second actuating piston 9, a piston-to-shaft connection rod 10, a second piston-to-shaft connection rod 11, a single-throw shaft 12, a means 13 of rotably connecting the shaft to the housing, a rigid connection means 14 between compression piston 4 and actuating piston 8, a second rigid connection means 15 between the other compression and actuating pistons, a sliding guide 16 between the two actuating pistons, a push rod 17 to actuate the injection means and the exhaust valves, a stopper 18 on the push rod, another stopper 19 on the push rod, a valve arm 20, an exhaust valve 21, another valve arm 22, another exhaust valve 23, an injection means 24, another injection means 25, air-intake scoops 26 and 27, exhaust manifolds 28 and 29, combustion chambers 30 and 31, compression passageways 32 and 33, actuating-pressure passageways 34 and 35, actuating-piston extension arms 36 and 37, push-rod injection stoppers 38 and 39, injection means 40 and 41, compression cylinders 42 and 43, actuating cylinders 44 and 45, exhaust-outlet ports for example, 47.

The operation of this device is accomplished in the following manner. Compression piston 2 is caused to compress air into combustion chamber 30. Fuel is injected by injection means 25 into combustion chamber 30 at the completion of the outward stroke of compression piston 2. Combustion then takes place. The products of combustion are first directed through actuating-pressure passageway 34 to force actuating piston 9 on an inward stroke. The combustion forces are allowed to escape past outlet valve 23 and through exhaust manifold 29. The inward stroke of actuating piston 9 causes compression piston 2 to move inward as a result of the rigid connection between compression piston 2 and actuating piston 9. Air is thus drawn in through air scoop 27 and past intake valve 3 which is caused to be open during such intake and closed on the later outward compression stroke of compression piston 2. Compression piston 4 is caused to travel in an outward direction and compress air past compression valve 6 and through compression passageway 32 to combustion chamber 31. As the stroke of compression piston 4 and actuating piston 8 reach the outward ends of their travel, combustion is caused to take place in combustion chamber 31. Actuating-piston extension arm 37 slides along push rod 17 and engages stopper 18 on the inward stroke of pistons 2 and 9. The push rod 17 is caused to move valve arm 22 to open outlet valve 23 after sufficient force has been directed against actuating piston 9 to cause intake past valve 3 and compression in compression chamber 32. After outlet valve 23 has been opened, the products of combustion then pass out through exhaust manifold 29 for prime-mover adaptations. The momentum of the shaft with sufficient weight to act as a fly-wheel and the continued action of combustion against piston 9 cause compression piston 4 to complete its outward compression stroke and cause injection stopper 38 to engage injection means arm 40 and fuel is injected into combustion chamber 31. A cycle is thus described. It is repeated in a like manner alternately at the opposite sides of the shaft.

Also included in the scope of this invention are all means of accomplishing the same results with the same main features but with substitution of equivalents such as a rotating or other type cam action to replace the push-rod assembly operating the injection means and exhaust valves. Another substitution of equivalents is the use of electrical means to operate the valves and injection system. Any positive-action valve-operating device for the remaining valves is also within the concept of this invention and is intended to be employed in certain applications of this invention where positive-action valves are desirable for speed and accuracy.

What is claimed is:

In a positive power jet engine, opposed reciprocating compression pistons, combustion chambers located at the outer end of each compression piston such that air is compressed into the combustion chambers, actuating pistons appreciably smaller than the compression pistons and made to actuate the compression pistons, thrust chambers leading from each combustion chamber such that products of combustion are directed therethrough to produce operating power, exhaust valve means to prevent pressure from escaping from the combustion chambers to the compression pistons, air passageways through which air is conveyed from the compression pistons to the thrust chambers, exhaust passageways through which products of combustion are conveyed from the combustion chambers to the actuating pistons, compression piston actuating arms which connect the actuating pistons to the compression pistons, compression piston connecting rods, fuel igniter injectors, air intake valves, air intake manifolds, thrust valves which retain compression prior to combustion and that retain later products of combustion in the combustion chambers sufficiently such that the actuating pistons are caused to actuate the compression pistons from pressures directed against the actuating pistons when products of combustion are escaping simultaneously from the combustion chamber through the thrust chamber, a single throw shaft to which the compression piston connecting rods are connected in such a manner that the pistons are prevented from striking the housing at the outer ends of the strokes and such that operating mechanisms can be powered by said shaft, and actuating piston connecting rods.

References Cited in the file of this patent

UNITED STATES PATENTS

| | | |
|---|---|---|
| 581,385 | Woillard | Apr. 27, 1897 |
| 779,509 | Traviss | Jan. 10, 1905 |
| 811,809 | Williams | Feb. 6, 1906 |
| 1,138,783 | Perugini | May 11, 1915 |
| 1,212,105 | Reese et al. | Jan. 9, 1917 |
| 1,323,139 | Woods | Nov. 25, 1919 |
| 1,393,831 | Rossman | Oct. 18, 1921 |
| 1,595,022 | Powell | Aug. 3, 1926 |
| 1,849,347 | Dale | Mar. 15, 1932 |
| 2,271,011 | Hubbard | Jan. 27, 1942 |
| 2,297,239 | Neugebauer | Sept. 29, 1942 |
| 2,466,255 | Mercier et al. | Apr. 5, 1949 |
| 2,807,136 | Foster | Sept. 24, 1957 |

FOREIGN PATENTS

| | | |
|---|---|---|
| 259,088 | Germany | Apr. 24, 1913 |